United States Patent [19]
Graf

[11] Patent Number: 6,108,095
[45] Date of Patent: Aug. 22, 2000

[54] METHOD AND SYSTEM FOR DETERMINING A COLOR FORMULA TO ENABLE REPRODUCTION OF A COLOR STANDARD ON ONE OR MORE PRODUCTION LINES

[75] Inventor: John Frederick Graf, Ballston Lake, N.Y.

[73] Assignee: General Electric Company, Schenectady, N.Y.

[21] Appl. No.: 09/384,168

[22] Filed: Aug. 27, 1999

[51] Int. Cl.[7] .................................................... G01J 3/46
[52] U.S. Cl. ........................................ 356/425; 356/402
[58] Field of Search ................................... 356/425, 402; 382/162, 165, 166, 167; 345/150

[56] References Cited

U.S. PATENT DOCUMENTS

| | | | |
|---|---|---|---|
| 5,668,633 | 9/1997 | Cheetam et al. .......................... | 356/402 |
| 5,720,017 | 2/1998 | Cheetam et al. .......................... | 395/131 |
| 5,740,078 | 4/1998 | Cheetam et al. .......................... | 364/526 |
| 5,764,386 | 6/1998 | Robinson ................................. | 358/504 |
| 5,841,421 | 11/1998 | Cheetam et al. ......................... | 345/150 |
| 6,043,894 | 3/2000 | Van Aken et al. ....................... | 356/425 |

*Primary Examiner*—Frank G. Font
*Assistant Examiner*—Layla Lauchman
*Attorney, Agent, or Firm*—David C. Goldman; Jill M. Breedlove

[57] ABSTRACT

A method and a system for determining a color formula to enable reproduction of a color standard on one or more production lines, which includes for example, reading a color spectrum of the color standard with a spectrophotometer, and retrieving data such as absorption and scattering coefficients regarding a plurality of color samples produced by a production line. The color spectrum and coefficients are then processed, for example in a color model, to predict the color formula thereby reducing the need to adjust the color formula during start-up of the production line in order to match the color standard. Desirably, the method and system are operable to selectively provide a color formula for reproducing the color standard on any one of a plurality of different production lines.

23 Claims, 5 Drawing Sheets

METHOD AND SYSTEM FOR DETERMINING A COLOR FORMULA TO ENABLE REPRODUCTION OF A COLOR STANDARD ON ONE OR MORE PRODUCTION LINES

BACKGROUND OF THE INVENTION

This invention relates generally to color formulation development, and more particularly, to determining a color formula for reproduction of a color standard.

Plastic manufacturers typically receive orders from customers for colored plastics in amounts ranging from 10,000 pounds to 100,000 pounds. A colored plastic typically requires a specific color formula that is usually composed of four to five pigments or dyes in specified concentrations. A prior art process 10 for large-scale production of a colored plastic is illustrated in FIG. 1.

Initially, at 12, a customer places an order for a certain amount of plastic having a specific color and provides the manufacturer with a sample of the color.

If the color is not one of the manufacturer's standard colors, the manufacturer develops a color formula at 14 and using laboratory-scale equipment processes a 1 pound to a 5 pound batch from which a color sample or plaque is made at 15. The plaque or color sample is then sent to the customer for approval.

At 16, if the customer approves the color sample, the color sample becomes a color standard. Then at 17, the manufacturer begins production on a production line using the developed color formula.

However, it has been observed that a color formula that produces one color on laboratory-scale equipment produces a slightly different color when produced on a production line. While the color change is usually small, it is often noticeable to the customer and requires correction.

Thus at 18, the manufacture modifies the color formula by adjusting the relative concentrations of pigments or dyes to better match the customer's approved color standard.

For example, if the colored plastic initially produced on the production line is a little less yellow compared to the color standard, then a color technician on the production line will add a little more yellow pigment to bring the color back on target. This color correction process results in increased labor costs and lost production capacity of the production line. In addition, running the production line before the colored plastic matches the color standard results in wasted or rejected material.

SUMMARY OF THE INVENTION

Therefore, there is a need for scaling-up color formulas for reproduction of a color standard on one or more production lines. The above-mentioned need is satisfied by the present invention which provides in one aspect a computer-implemented method for determining a color formula to enable reproduction of a color standard on one or more production lines in which the computer-implemented method includes retrieving a characteristic of the color standard, retrieving data regarding a plurality of color samples produced on a production line, and processing the characteristic and the data to determine the color formula to enable reproduction of the color standard on the production line.

The retrieving may include retrieving the data regarding the plurality of color samples produced on the production line from data regarding a plurality of color samples produced on a plurality of different production lines. Desirably, the characteristic is an optical measurement such as a color spectrum of the color standard and the data are absorption and scattering coefficients. The characteristic and data are processed in a color model for predicting the color formula to enable reproduction of the color standard on the production line.

In another aspect, a system for determining a color formula to enable reproduction of a color standard on one or more production lines includes a spectrophotometer for reading a characteristic of the color standard, and a processor for retrieving data regarding a plurality of color samples produced on the production line and for processing the characteristic and the data to determine the color formula to enable reproduction of the color standard on the production line.

DETAILED DESCRIPTION OF THE INVENTION

Figure 2:
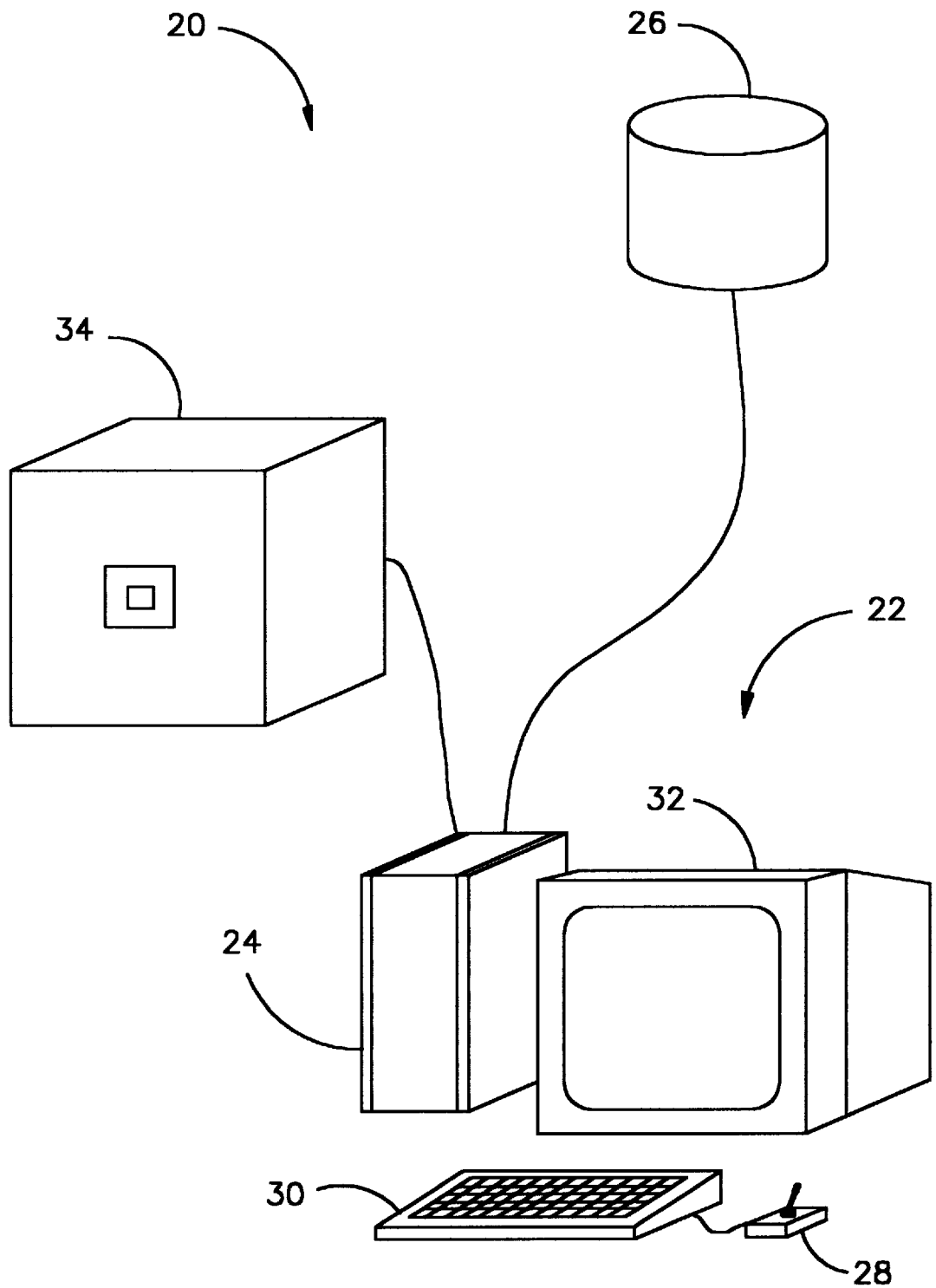
FIG. 2 diagram illustrating the system used in the present invention.

FIG. 2 is a diagram illustrating a system 20 used in the present invention for determining a color formula for large-scale production of a color standard formed on laboratory-scale equipment. In this exemplary system 20, a color formula is determined to enable reproduction of a color standard on a production line which reduces, if not eliminates, the need to adjust the color formula during start-up of the production line. In addition, as will be explained in greater detail below, this exemplary process also allows a manufacturer to determine a color formula to enable reproduction of the color standard on any one of a plurality of different production lines.

Exemplary system 20 includes a processor 22 such as a personal computer having an Intel PENTIUM processor with 64 megabytes of RAM. The processor is run by application software embodied in a hard disk 24 such as Microsoft WINDOWS operating system. A user communicates with processor 22 and a data storage unit 26 by a mouse 28 or other pointing device and a keyboard 30. The results, e.g., a color formula, is displayed on a display 32 or may be printed out by a printer (not shown). Connected to processor 22 is a spectrophotometer 34 such as a MacBeth 7000 or 2020 for reading or obtaining optical measurements of the color standard.

The invention is not limited to such an environment, however. The present invention can be incorporated and used within many types of computer environments and many types of computer systems. From the following description, computer readable program code means for use in the computing environment or processor 22 and for implementing the color formula predicting techniques of the present invention may be readily programmed by those skilled in the art and stored on the above-noted storage media or devices, or imbedded in an integrated circuit.

Figure 3:
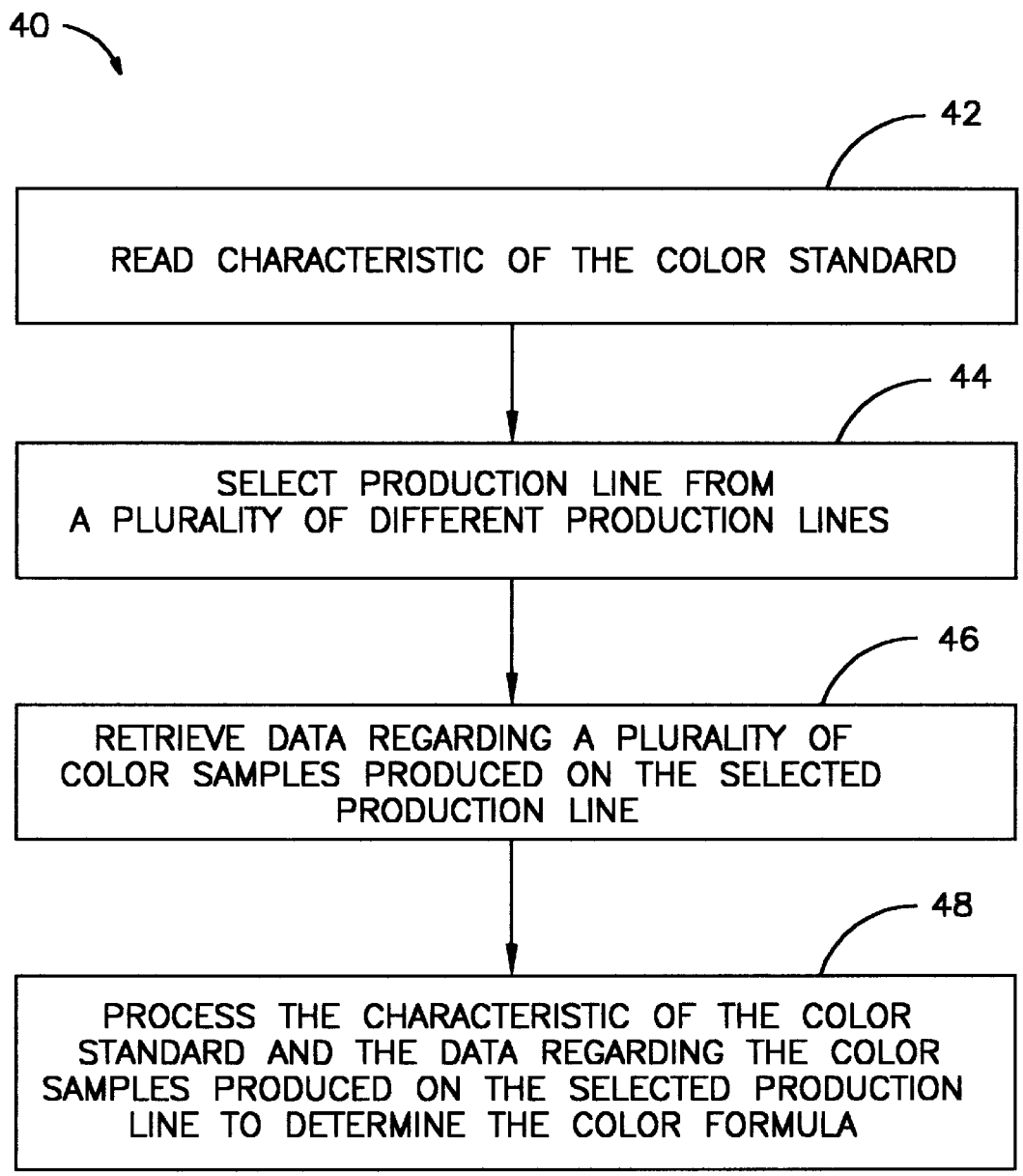
FIG. 3 is a flowchart illustrating the operation of the present invention.

FIG. 3 is a flowchart illustrating an exemplary process 40 of the present invention. This exemplary process starts at 42 where the color standard is placed in spectrophotometer 34 (FIG. 2) and an optical measurement such as the color standard's color spectrum is then read. Next, the user selects a production line on which the color standard is to be reproduced from a plurality of production lines at 44. For example, a manufacturing facility may have numerous different production lines such as a 38 mm single screw extruder, a 108 mm twin screw extruder, etc.

Figure 1:
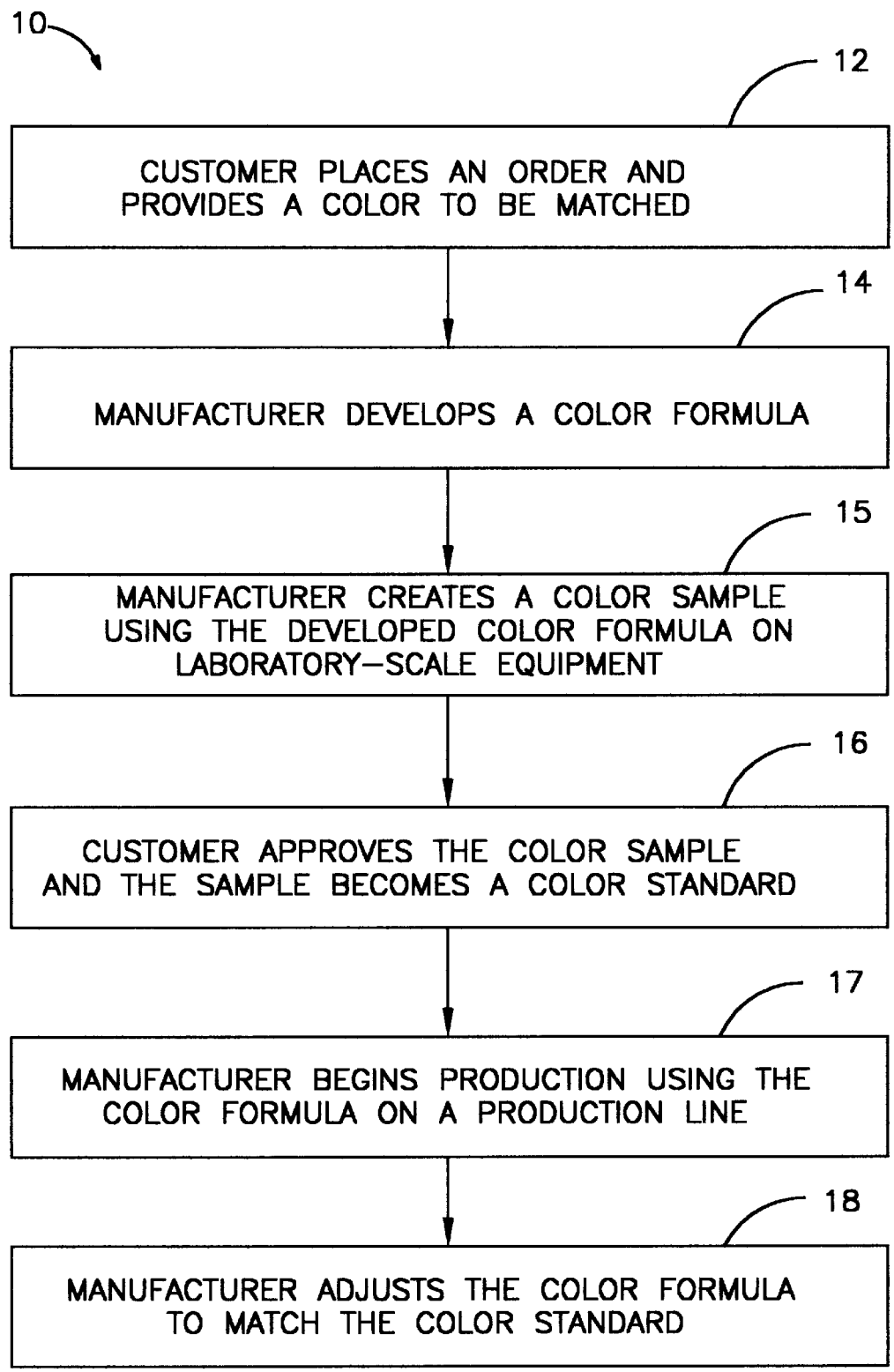
FIG. 1 is a flowchart illustrating a prior art process for large-scale production of a colored plastic.

Processor 22 then retrieves data regarding a plurality of prior art color samples produced on the selected production line from data storage unit 26 (FIG. 1) at 46. The characteristic of the color standard and the retrieved data are then processed at 48 to determine a color formula for reproducing the color standard on the selected production line.

Exemplary process 40 may include, for example, a color model based on the Kubelka-Munk theory for determining a color formula. The Kubelka-Munk theory describes how absorption and scattering of colorants in a color standard are related to the visible spectral curve and its color. According to the Kubelka-Munk theory, each colorant contributes to the absorption and scattering of the color standard, with each colorant's contribution being proportional to its concentration, e.g., the amount of its presence, multiplied by an absorption and scattering coefficient.

Figure 4:
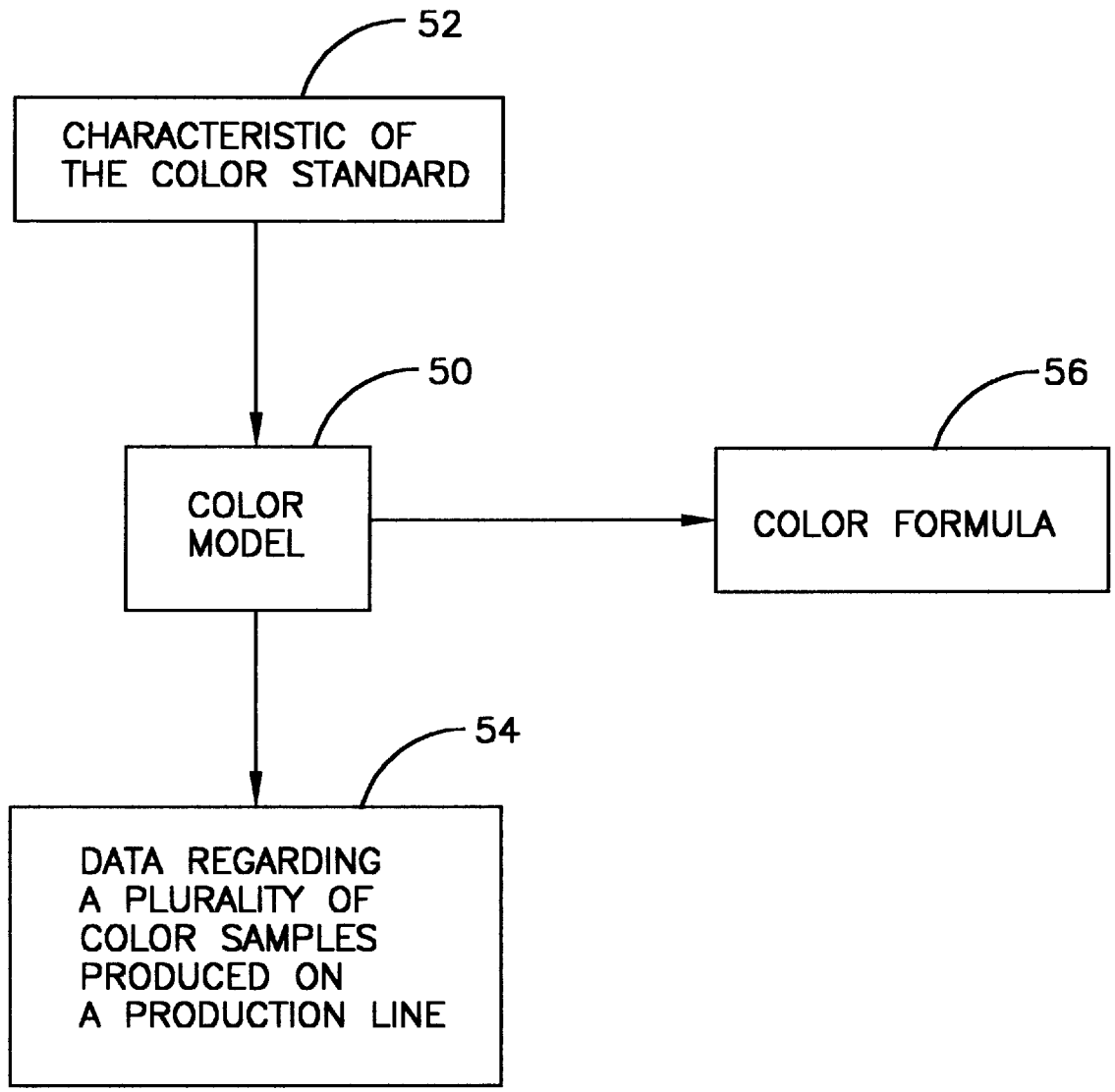
FIG. 4 is a block diagram illustrating the use of a color model in the operation of the present invention.

FIG. 4 illustrates the use of a color model 50 in process 40 illustrated in FIG. 3. A characteristic such as the color spectrum of the color standard and the data regarding the plurality of color samples produced on the production line such as the absorption and scattering coefficients of each ingredient are inputted, at 52 and 54 respectively, into the color model 50, and processed to determine a color formula 56.

Figure 5:
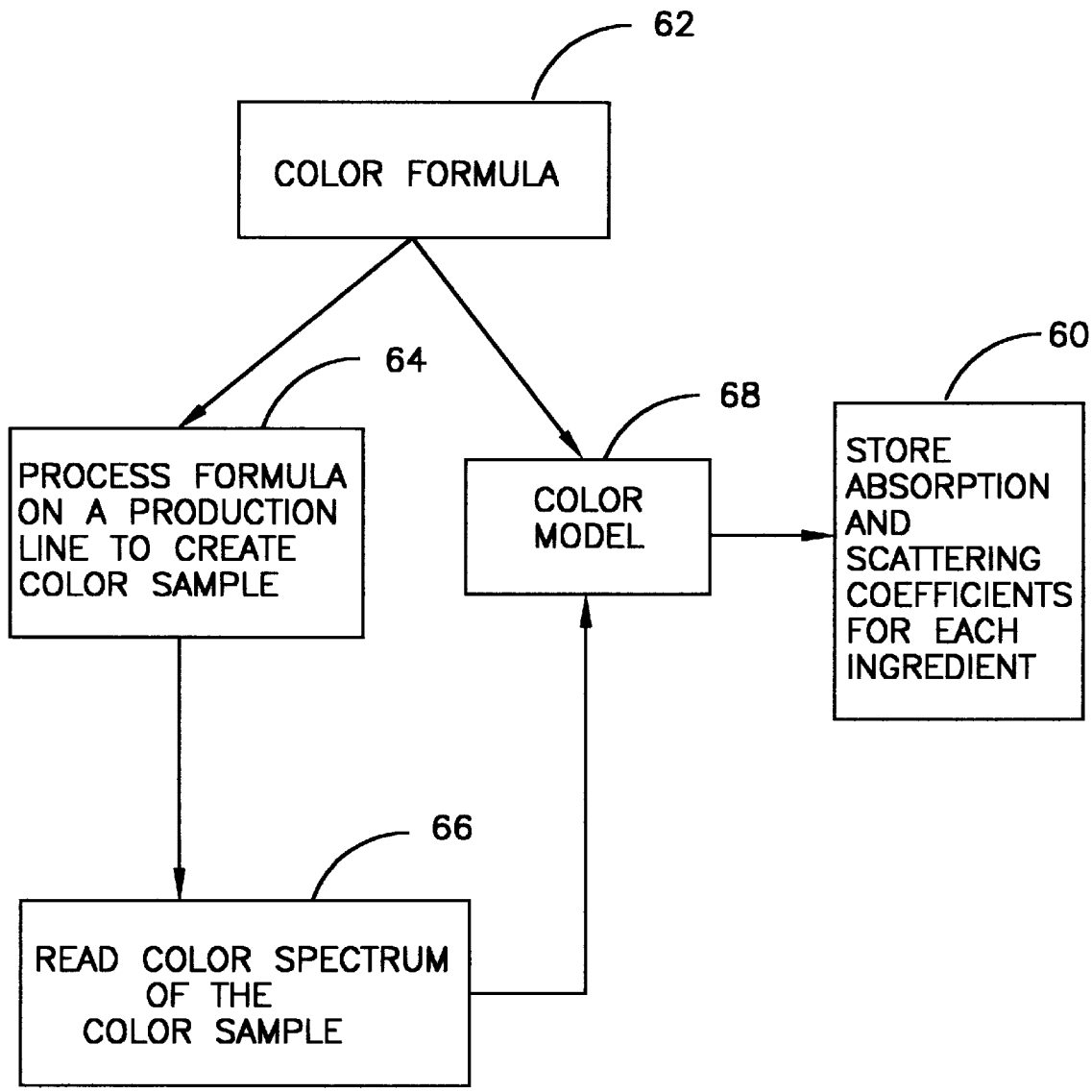
FIG. 5 is a block diagram illustrating the characterization of absorption and scattering coefficients used in a color model for a plurality of production lines.

FIG. 5 is a block diagram illustrating a process for determining or characterizing absorption and scattering coefficients 60 for one or more production lines. The absorption and scattering coefficients 60 are obtained by using prior production runs of a number of batches of colored plastic on a production line with each batch having a known color formula 62 (ingredients and amounts). For each color sample 64, a characteristic of the color sample 64 is measured using instrumentation such as spectrophotometer 34.

With the color formulas and the measured characteristics of the color samples, it is possible to least squares fit (LSF) a color model 68, to the data to determine absorption and scattering coefficients 60 for each ingredient for the production line. The absorption and scattering coefficients 60 can then be stored in data storage unit 26 (FIG. 2) and used as described above with reference to FIG. 4.

Desirably, the process shown in FIG. 5 is repeated for a number of batches produced on a plurality of different production lines so that the scattering and absorption coefficients for each ingredient is characterized for each of the plurality of production lines. From the present description, each production line has errors and biases based on the compounding and molding process (e.g., different processing equipment) and the color measurements (e.g., by the spectrophotometer) which cause a color produced having a color formula on a given production line to differ from the color produced on other production lines.

With the coefficients characterized for each ingredient under each production line, a color formula for reproducing a color standard on any of the production lines can be determined by measuring a characteristic of the color standard such as the color spectrum, retrieving the coefficients regarding the desired or selected production line, and inputting the color spectrum along with the absorption and scattering coefficients for each ingredient into a color model to predict the color formula.

Advantageously, the color formula for reproducing the color standard can be determined prior to start-up of the production line thereby reducing time and wasted material in filling the customer's order for the production of a colored plastic. In addition, the capacity of the production lines are increased.

From the present description, it will be appreciated by those skilled in the art that the colored plastic produced on each production line for a customer can be used to update the absorption and scattering coefficients in data storage with 26.

In addition, from the present description, it will be appreciated by those skilled in the art that processes, other than using a color model, can be used to predict the color formula for reproducing the color standard on a production line process. For example, the processor can be configured to match the measured characteristic of the color standard to a database of measured characteristics of a plurality of batches of color samples produced on a plurality of production lines. Suitable matching processes are disclosed in U.S. Pat. Nos. 5,668,633; 5,720,017; 5,740,078; and 5,841,421 in which the entire subject matter of these patents are incorporated herein by reference.

Also, from the present description, it will be appreciated by those skilled in the art that it may be possible to directly measure a characteristic of the color, e.g., a colored plastic, paper, cloth, ceramic, etc., provided by the customer to be matched, and input the measured characteristic of the color into the color model for determining the color formula for the production line.

Thus, while various embodiments of the present invention have been illustrated and described, it will be appreciated to those skilled in the art that many changes and modifications may be made thereunto without departing from the spirit and scope of the invention.

What is claimed is:

1. A computer-implemented method for determining a color formula to enable reproduction of a color standard on one or more production lines, the computer-implemented method comprising:
   retrieving a characteristic of the color standard;
   retrieving data regarding a plurality of color samples produced on a production line; and
   processing the characteristic and the data to determine the color formula to enable reproduction of the color standard on the production line.

2. The computer-implemented method of claim 1 wherein the retrieving data comprises retrieving the data regarding the plurality of color samples produced on the production line from data regarding a plurality of color samples produced on a plurality of different production lines.

3. The computer-implemented method of claim 1 further comprising storing data regarding a plurality of color samples produced on the plurality of different production lines.

4. The computer-implemented method of claim 1 wherein the processing comprises a color model.

5. The computer-implemented method of claim 4 wherein the retrieving data comprises retrieving absorption and scattering coefficients for the plurality of color samples produced on the production line.

6. The computer-implemented method of claim 5 wherein the retrieving data comprises retrieving the absorption and scattering coefficients regarding the plurality of color samples produced on the production line from a plurality of absorption and scattering coefficients regarding a plurality of color samples produced on a plurality of different production lines.

7. The computer-implemented method of claim 6 further comprising storing data regarding the plurality of color samples produced on the plurality of different production lines.

8. The computer-implemented method of claim 1 wherein the characteristic is an optical measurement.

9. The computer-implemented method of claim 7 wherein the optical measurement is measured by a spectrophotometer.

10. The computer-implemented method of claim 1 wherein the color formula comprises ingredients and amounts.

11. The computer-implemented method of claim 1 wherein the color standard is produced on laboratory-scale equipment.

12. A system for determining a color formula to enable reproduction of a color standard on one or more production lines, said system comprising:

a spectrophotometer for reading a characteristic of the color standard; and a processor for retrieving data regarding a plurality of color samples produced on a production line, and for processing the characteristic and the data to determine the color formula to enable reproduction of the color standard on the production line.

13. The system of claim 12 wherein the processor comprises means for retrieving the data regarding the plurality of color samples produced on the production line from data regarding a plurality of color samples produced on a plurality of different production lines.

14. The system of claim 12 wherein the processor further comprising means for storing data regarding a plurality of color samples produced on the plurality of different production lines.

15. The system of claim 12 wherein the processor comprises a color model.

16. The system of claim 15 wherein the data comprises absorption and scattering coefficients for the plurality of color samples produced on the production line.

17. The system of claim 16 wherein the processor comprises means for retrieving the absorption and scattering coefficients regarding the plurality of color samples produced on the production line from a plurality of absorption and scattering coefficients regarding a plurality of color samples produced on a plurality of production lines.

18. The system of claim 17 wherein the processor comprises means for storing data regarding a plurality of color samples produced on the plurality of different production lines.

19. The system of claim 13 wherein the characteristic is an optical measurement.

20. The system of claim 12 wherein the color formula comprises ingredients and amounts.

21. The system of claim 12 wherein the color standard is produced on laboratory-scale equipment.

22. An article of manufacture comprising at least one computer usable medium having computer readable program code means embodied therein for determining a color formula to enable reproduction of a color standard on one or more production lines, the computer readable program code means in said article of manufacture comprising:

computer readable program code means for retrieving a characteristic of the color standard;

computer readable program code means for retrieving data regarding a plurality of color samples produced on a production line; and computer readable program code means for processing the characteristic and the data to determine the color formula to enable reproduction of the color standard on the production line.

23. At least one program storage device readable by a machine, tangibly embodying at least one program of instructions executable by the machine to perform a method for determining a color formula to enable reproduction of a color standard on one or more production lines, said method comprising;

retrieving a characteristic of the color standard;

retrieving data regarding a plurality of color samples produced on a production line; and processing the characteristic and the data to determine the color formula to enable reproduction of the color standard on the production line.

* * * * *